(12) United States Patent
Takahashi et al.

(10) Patent No.: US 10,587,008 B2
(45) Date of Patent: Mar. 10, 2020

(54) ELECTROLYTE SOLUTION FOR SECONDARY BATTERY AND SECONDARY BATTERY USING SAME

(71) Applicant: NEC Corporation, Tokyo (JP)

(72) Inventors: Makiko Takahashi, Tokyo (JP); Takehiro Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 61 days.

(21) Appl. No.: 15/039,585

(22) PCT Filed: Nov. 25, 2014

(86) PCT No.: PCT/JP2014/081117
§ 371 (c)(1),
(2) Date: May 26, 2016

(87) PCT Pub. No.: WO2015/080102
PCT Pub. Date: Jun. 4, 2015

(65) Prior Publication Data
US 2017/0170520 A1 Jun. 15, 2017

(30) Foreign Application Priority Data

Nov. 28, 2013 (JP) .................................. 2013-246605

(51) Int. Cl.
*H01M 10/0569* (2010.01)
*H01M 10/052* (2010.01)
(Continued)

(52) U.S. Cl.
CPC ....... *H01M 10/0569* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 5,580,684 A * 12/1996 Yokoyama ........ H01M 10/0567
252/500
9,905,887 B2   2/2018 Takahashi et al.
(Continued)

FOREIGN PATENT DOCUMENTS

CN    1477729    2/2004
CN    101714657  5/2010
(Continued)

OTHER PUBLICATIONS

Machine Translation of JP 11-283669 A (Year: 1999).*
(Continued)

*Primary Examiner* — Robert S Carrico
(74) *Attorney, Agent, or Firm* — Finnegan, Henderson, Farabow, Garrett & Dunner, L.L.P.

(57) ABSTRACT

The present invention provides a lithium ion secondary battery having excellent high temperature cycle characteristics. The present invention relates to an electrolyte solution containing a non-aqueous electrolyte solvent containing two or more open chain sulfone compounds represented by a specific formula and one or more carbonate ester compounds represented by a specific formula; and to a secondary battery comprising these.

12 Claims, 1 Drawing Sheet

(51) Int. Cl.
*H01M 4/58* (2010.01)
*H01M 4/525* (2010.01)
*H01M 4/505* (2010.01)
*H01M 10/0525* (2010.01)
*H01M 10/058* (2010.01)
*H01M 4/02* (2006.01)

(52) U.S. Cl.
CPC ....... *H01M 4/5825* (2013.01); *H01M 10/052* (2013.01); *H01M 10/058* (2013.01); *H01M 10/0525* (2013.01); *H01M 2004/028* (2013.01); *H01M 2300/0034* (2013.01); *H01M 2300/0037* (2013.01); *Y02T 10/7011* (2013.01)

(56) References Cited

U.S. PATENT DOCUMENTS

| | | | |
|---|---|---|---|
| 2007/0224516 | A1 | 9/2007 | Deguchi et al. |
| 2010/0092872 | A1 | 4/2010 | Abe et al. |
| 2011/0053003 | A1 | 3/2011 | Deguchi |
| 2013/0078530 | A1* | 3/2013 | Kishi ................ H01M 10/0569 429/338 |
| 2013/0266847 | A1 | 10/2013 | Noguchi et al. |
| 2014/0017559 | A1 | 1/2014 | Kawasaki et al. |
| 2014/0017560 | A1* | 1/2014 | Sakata .............. H01M 10/0569 429/200 |
| 2014/0023916 | A1 | 1/2014 | Koh et al. |
| 2014/0227611 | A1* | 8/2014 | Nakamura ........ H01M 10/0525 429/330 |
| 2015/0140443 | A1 | 5/2015 | Takahashi et al. |
| 2015/0303521 | A1 | 10/2015 | Sasaki |
| 2017/0170520 | A1 | 6/2017 | Takahashi et al. |

FOREIGN PATENT DOCUMENTS

| | | |
|---|---|---|
| CN | 102306838 | 1/2012 |
| CN | 102403535 A | 4/2012 |
| CN | 102569885 | 7/2012 |
| CN | 103250295 A | 8/2013 |
| CN | 103401020 A | 11/2013 |
| JP | 3-152879 | 6/1991 |
| JP | 2734978 | 4/1998 |
| JP | 11283669 A * | 10/1999 |
| JP | 2000-21447 | 1/2000 |
| JP | 2001-243982 | 9/2001 |
| JP | 3291528 | 6/2002 |
| JP | 3451781 | 9/2003 |
| JP | 2007-287677 | 11/2007 |
| JP | 2010-146740 | 7/2010 |
| JP | 2011-23330 | 2/2011 |
| JP | 2013-069938 | 4/2013 |
| JP | 2014-137996 | 7/2014 |
| WO | WO 2008/133112 A1 | 11/2008 |
| WO | WO 2009/035085 A1 | 3/2009 |
| WO | WO 2010/090028 A1 | 8/2010 |
| WO | WO 2011/040443 A1 | 4/2011 |
| WO | WO 2011/040447 A1 | 4/2011 |
| WO | WO 2011/162169 A1 | 12/2011 |
| WO | WO 2012/077712 A1 | 6/2012 |
| WO | WO 2012/132059 A1 | 10/2012 |
| WO | WO 2012/133902 A1 | 10/2012 |
| WO | WO-2012133698 A1 * 10/2012 ........ H01M 10/0569 |
| WO | WO-2013042503 A1 * 3/2013 ........ H01M 10/0525 |
| WO | WO 2013/069474 | 5/2013 |
| WO | WO 2013/129428 A1 | 9/2013 |
| WO | WO 2013/183655 A1 | 12/2013 |
| WO | WO 2014/080871 A1 | 5/2014 |
| WO | WO 2014/181877 A1 | 11/2014 |

OTHER PUBLICATIONS

International Search Report and Written Opinion dated Mar. 10, 2015, in corresponding PCT International Application.
Notification of First Office Action from the State Intellectual Property Office of the People's Republic of China dated Oct. 10, 2017, in counterpart Chinese Patent Application No. 201480064980.X.
Final Office Action dated Jul. 30, 2018, in U.S. Appl. No. 15/521,276.
Non-final Office Action in co-pending U.S. Appl. No. 15/521,276, dated Mar. 26, 2018.
International Search Report and Written Opinion issued in the counterpart International Application of co-pending U.S. Appl. No. 15/521,276, dated May 4, 2017
Notification of Second Office Action dated Jul. 19, 2018, by the Chinese Patent Office in counterpart Chinese Patent Application No. 201480064980.X.

* cited by examiner

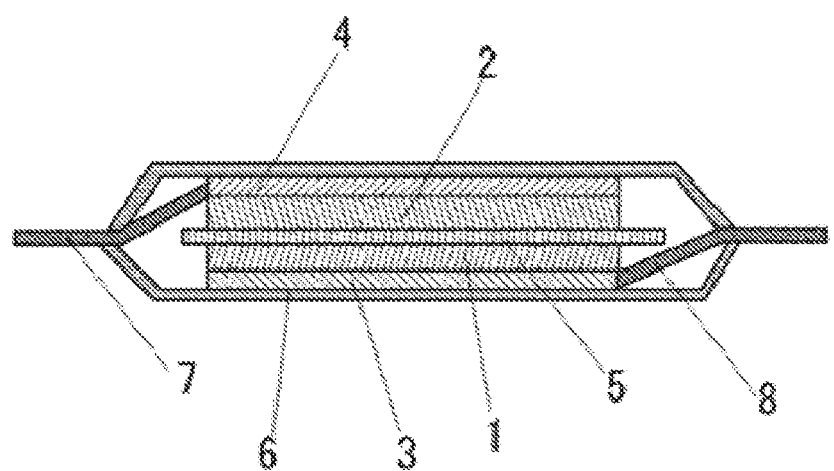

ELECTROLYTE SOLUTION FOR SECONDARY BATTERY AND SECONDARY BATTERY USING SAME

CROSS-REFERENCE TO RELATED PATENT APPLICATIONS

This application is a National Stage Entry of International Application No. PCT/JP2014/081117, filed Nov. 25, 2014, which claims priority from Japanese Patent Application No. 2013-246605, filed Nov. 28, 2013. The entire contents of the above-referenced applications are expressly incorporated herein by reference.

TECHNICAL FIELD

The present invention relates to an electrolyte solution for a secondary battery, and a lithium ion secondary battery using the same.

BACKGROUND ART

Lithium ion secondary batteries, which have small size and large capacity, have been widely used as power supplies for electronic devices such as mobile phones and notebook computers and have contributed to enhancing convenience of mobile IT devices. Attention is now drawn to use of such batteries in large-scale applications, for example, power sources for automobiles and the like, and power storage devices for smart grid.

It is urgent to further increase the energy density of lithium ion secondary batteries, and examples of the process to increase the energy density include a process of using active materials having large capacity, a process of increasing the operating potentials of batteries, and a process of enhancing the charge/discharge efficiency, cycle life and the like. Among these, the process of increasing the operating potentials of the battery is a measure effective for size and weight reduction of battery modules used in electric vehicles and the like because the process can provide fewer numbers of battery packs in series.

However, use of a high potential positive electrode, for example, causes problems due to decomposition of electrolyte solutions, such as gas evolution and a drop in capacity in long-term cycles and under high-temperature storage because the electrolyte solution is exposed to the high potential positive electrode for a long period. This problem becomes serious when using the positive electrode material having high charge and discharge potential especially at 4.5 V or higher. To solve these problems, it has been proposed to use various electrolytes.

Patent Document 1 discloses that the use of a compound having S—O bonds such as sulfolane or dimethyl sulfone in an electrolyte solution suppresses the decomposition of the electrolyte solution in a charged state, and suppress the increase in internal resistance. Patent Documents 2 to 4 disclose examples using an electrolyte solution containing a cyclic carbonate and an open chain sulfone. It discloses that the use of the electrolyte solution containing an open chain sulfone improves cycle characteristics at high temperature and storage characteristics, compared with an electrolyte solution based on only carbonates. Also, an electrolyte solution containing a compound other than a carbonate-based solvent and an open chain sulfone compound has been disclosed. Patent Document 5 discloses a non-aqueous electrolyte battery comprising an electrolyte containing an open chain sulfone compound and an open chain ester compound. Patent Document 6 discloses a non-aqueous solvent for an electricity storage device containing a fluorinated cyclohexane, an open chain sulfone compound and a cyclic sulfone compound.

CITATION LIST

Patent Document

Patent Document 1: Japanese Patent Laid-Open No. H3-152879
Patent Document 2: Japanese Patent No. 3451781
Patent Document 3: Japanese Patent No. 2734978
Patent Document 4: Japanese Patent No. 3291528
Patent Document 5: Japanese Patent Laid-Open No. 2000-21447
Patent Document 6: Japanese Patent Laid-Open No. 2011-23330

SUMMARY OF INVENTION

Technical Problem

However, when the lithium secondary batteries using the electrolyte solution described in Patent Documents 1-5 are used at high temperature, there is a problem of low cycle characteristics at high temperatures. Further, the electrolyte solution described in Patent Document 6 has insufficient rate characteristics, and therefore further improvement has been demanded.

Solution to Problem

The present embodiment relates the following items.

An electrolyte solution for a secondary battery comprising a non-aqueous electrolyte solvent comprising two or more compounds selected from open chain sulfone compounds represented by the following formula (1), and one or more compounds selected from carbonate ester compounds represented by the following formula (2);

(in formula (1), $R_1$ and $R_2$, each independently, represent a substituted or non-substituted alkyl group.),

(in formula (2), $R_1$ and $R_2$, each independently, represent a substituted or non-substituted alkyl group; and a carbon atom of $R_1$ and a carbon atom of $R_2$ may be bonded through a single bond or a double bond to form a cyclic structure.).

Advantageous Effect of Invention

According to the present embodiment, there is provided a non-aqueous secondary battery excellent in long-term cycle characteristics under high temperature conditions.

BRIEF DESCRIPTION OF DRAWING

The FIGURE is a cross-sectional view of one embodiment of a lithium secondary battery of the present invention.

DESCRIPTION OF EMBODIMENT

The present embodiment relates to an electrolyte solution for a secondary battery comprising a non-aqueous electrolyte solvent comprising two or more compounds selected from open chain sulfone compounds represented by the following formula (1), and one or more compounds selected from carbonate ester compounds represented by the following formula (2).

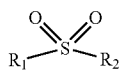

(1)

(in formula (1), $R_1$ and $R_2$, each independently, represent a substituted or non-substituted alkyl group.)

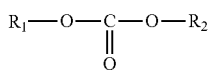

(2)

(in formula (2), $R_1$ and $R_2$, each independently, represent a substituted or non-substituted alkyl group; and a carbon atom of $R_1$ and a carbon atom of $R_2$ may be bonded through a single bond or a double bond to form a cyclic structure.)

The use of the electrolyte solution of the present invention can provide a lithium ion secondary battery excellent in cycle characteristics under high temperature conditions.

In addition, the electrolyte solutions described in Patent Documents 1 to 6 do not provide satisfactory characteristics when they are used in lithium secondary batteries with positive electrode active materials operating at a high potential, in particular, with those having a potential of 4.5V or higher versus lithium. In the secondary battery comprising positive electrode active materials having such a high potential, the decomposition reaction of the electrolyte solution occurs at contact portions of the positive electrode and the electrolyte solution, leading to problems of the increase in electrode resistance and decrease in capacity due to decomposition products, as well as the generation of gas.

The present inventors have revealed that the above problems are solved if the electrolyte solution of the present invention is used in a lithium secondary battery with positive electrode active materials operating at a potential of 4.5V or higher versus lithium, and therefore the gas generation under high temperature or high voltage are suppressed and cyclic characteristics are improved.

Hereinafter, an example of a secondary battery of the present invention will be described for each component.

[Electrolyte Solution]

an electrolyte solution of the present embodiment comprises lithium salt and a non-aqueous electrolyte solvent, wherein the non-aqueous electrolyte solvent comprises two or more open chain sulfone compounds represented by the following formula (1), and one or more carbonate ester compounds represented by the following formula (2). In this specification, the open chain sulfone compound represented by formula (1) may be referred to as simply "open chain sulfone compound", and the carbonate ester compound represented by the formula (2) may be referred to as simply "carbonate ester compound". In addition, the non-aqueous electrolyte solvent may be referred to as "non-aqueous solvent" or "solvent".

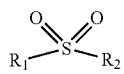

(1)

(in formula (1), $R_1$ and $R_2$, each independently, represent a substituted or non-substituted alkyl group.)

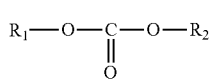

(2)

(in formula (2), $R_1$ and $R_2$, each independently, represent a substituted or non-substituted alkyl group; and a carbon atom of $R_1$ and a carbon atom of $R_2$ may be bonded through a single bond or a double bond to form a cyclic structure.)

In the open chain sulfone compound represented by formula (1), $n_1$ that is the number of carbon atoms of $R_1$ and $n_2$ that is the number of carbon atoms of $R_2$ are not particularly limited, but they preferably satisfy $1 \leq n_1 \leq 5$ and $1 \leq n_2 \leq 5$, respectively and more preferably $1 \leq n_1 \leq 3$ and $1 \leq n_2 \leq 3$, respectively. The alkyl group also includes straight-chain, branched-chain, and cyclic ones. If $n_1$ and $n_2$, which are numbers of carbon atoms of $R_1$ and $R_2$ of the open chain sulfone compound represented by formula (1), are individually 6 or more, the decrease in the cycle characteristics may be enhanced.

In $R_1$ and $R_2$ of formula (1), examples of the substituent group include aryl group having 6 to 10 carbon atoms (e.g., phenyl group, naphthyl group), halogen atom (e.g., chlorine atom, bromine atom, fluorine atom) and the like.

Preferred examples of $R_1$ and $R_2$ in formula (1) include alkyl groups such as —$CH_3$, —$CH_2CH_3$, —$CH_2CH_2CH_3$, —$CH(CH_3)CH_3$, —$CH_2CH_2CH_2CH_3$, —$CH_2CH(CH_3)CH_3$, —$CH(CH_3)CH_2CH_3$, —$CH(CH_3)_2$, —$CH_2CH(CH_3)_2$, —$C(CH_3)_3$. These hydrocarbyl groups may be fluorinated partially or entirely.

Examples of the open chain sulfone compounds represented by formula (1) include, for example, compounds represented by the following formulae.

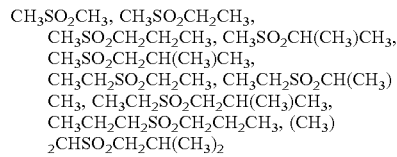

The open chain sulfone compound represented by formula (1) may be used in combination of three or more thereof.

In the present embodiment, the non-aqueous electrolyte solvent may comprise two or more open chain sulfone compounds, and preferably comprises two or more open chain sulfone compounds having different numbers of carbon atoms.

If the non-aqueous electrolyte solvent contains two sulfone compounds, these sulfone compounds preferably have different numbers of carbon atoms to each other, and more preferably the content of the sulfone compound having more carbon atoms is larger than the content of the sulfone compound having less carbon atoms. As a combination of two types of sulfone compounds, preference is given to, for example, a combination of an open chain sulfone compound having 3 or less carbon atoms and an open chain sulfone compound having 4 or more carbon atoms, and more preferably the content of the open chain sulfone compound having 4 or more carbon atoms is larger than the content of the open chain sulfone compound having 3 or less carbon atoms.

If the non-aqueous electrolyte solvent contains 3 or more sulfone compounds, at least two sulfone compounds among them have different numbers of carbon atoms to each other, and more preferably it contains at least one open chain sulfone compound having 3 or less carbon atoms and at least one open chain sulfone compound having 4 or more carbon atoms, and furthermore preferably, a content of the open chain sulfone compound having 4 or more carbon atoms (total content in case containing plural kinds) is larger than a content of the open chain sulfone compound having 3 or less carbon atoms (total content in case containing plural kinds).

While the open chain sulfone compound is excellent in stability under high temperature and high voltage, if one open chain sulfone compound is used solely, problems of gas generation or cycle characteristics and the like tend to occur. If only one type of open chain sulfone compound is used and if the number of carbon atoms in the open chain sulfone compound is small (for example, having 3 or less carbon atoms), gas generation tends to increase. On the other hand, if the number of carbon atoms in the open chain sulfone compound is large (for example, having 5 or more carbon atoms), cycle characteristic tends to be deteriorated. In case that a non-aqueous electrolyte solvent contains the mixture of one sulfone compound and a carbonate-based compound, the decrease in cycle characteristics are improved. However, when used under high temperature or high voltage in particular, the sufficient characteristics were not obtained. The present inventor has found that the use of two or more open chain sulfone compounds having different numbers of carbon atoms in combination with a carbonate ester compound provides larger effects in suppression of gas generation and in maintaining good cycle characteristics.

The content of open chain sulfone compounds (i.e. total content of two or more open chain sulfone compounds) represented by formula (1) is not particularly limited, but it is preferably 2 to 70% by volume, more preferably 3 to 60% by volume, more preferably 5 to 50% by volume, and further more preferably from 5 to 40% by volume in the entire non-aqueous electrolyte solvent. By setting the content of the open chain sulfone compounds represented by formula (1) to 5% by volume or more in the entire non-aqueous electrolyte solvent, decomposition of the electrolyte solution at high temperature is suppressed, and good long-term cycle characteristics can be obtained. Further, by setting the content of the open chain sulfone compounds represented by formula (1) to 70% by volume or less in the entire non-aqueous electrolyte solvent, an increase in viscosity of the electrolyte is suppressed, and good cycle characteristics even at room temperature can be maintained.

The non-aqueous solvent constituting the electrolyte solution, in addition to two or more open chain sulfone compounds, further comprises a carbonate ester compound represented by the following formula (2).

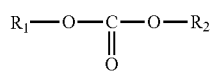
(2)

(in formula (2), $R_1$ and $R_2$, each independently, represent a substituted or non-substituted alkyl group; and a carbon atom of $R_1$ and a carbon atom of $R_2$ may be bonded through a single bond or a double bond to form a cyclic structure.)

The above carbonate ester compound has an effect of forming a film on the positive electrode, the negative electrode, or both, and thus, incorporation of these compounds can improve the cycling characteristics of the lithium ion secondary battery. Further, the carbonate ester compound improves the ionic dissociation of the electrolyte solution since it has high dielectric constant, and also lowers the viscosity of the electrolyte solution. Therefore, in addition to the film-forming effect, it can improve the ion mobility.

In formula (2), when $R_1$ and/or $R_2$ are substituted alkyl groups, examples of the substituent preferably include halogen atom (for example, chlorine atom, bromine atom, and fluorine atom), and fluorine atom is preferred.

In formula (2), $n_1$ that is the number of carbon atoms of $R_1$ and $n_2$ that is the number of carbon atoms of $R_2$ are not particularly limited, but they preferably satisfy $1 \leq n_1 \leq 5$ and $1 \leq n_2 \leq 5$, respectively and more preferably $1 \leq n_1 \leq 3$ and $1 \leq n_2 \leq 3$, respectively. The alkyl group also includes straight-chain, branched-chain, and cyclic ones.

Examples of the carbonate ester compound include cyclic carbonates and chain carbonates. Examples of the carbonate ester compound include ethylene carbonate (EC), propylene carbonate (PC), butylene carbonate (BC), vinylene carbonate (VC), dimethyl carbonate (DMC), diethyl carbonate (DEC), ethyl methyl carbonate (MEC), dipropyl carbonate (DPC), and a part or all of the hydrogen in these alkyl groups or alkylene groups may be substituted with a halogen atom, preferably a fluorine atom. Examples of the fluorinated cyclic carbonate which can be used include 4-fluoro-1,3-dioxolane-2-one{monofluoroethylene carbonate (FEC)}, (cis or trans)4,5-difluoro-1,3-dioxolane-2-one, 4,4-difluoro-1,3-dioxolane-2-one, and 4-fluoro-5-methyl-1,3-dioxolane-2-one. Among these, FEC is more preferred.

The electrolyte solution may contain the carbonate ester compound alone or in combination of two or more thereof. Among the carbonate ester compounds mentioned above, at least ethylene carbonate (EC) and/or propylene carbonate (PC), which are cyclic carbonates, are preferably contained. Chain carbonates such as dimethyl carbonate (DMC), diethyl carbonate (DEC), and methylethyl carbonate (MEC) may be further contained other than EC and PC.

The content of the carbonate ester compound in the total non-aqueous electrolytic solvent is preferably 1 to 50% by volume, more preferably from 5 to 50% by volume, and still more preferably from 10 to 30% by volume. Containing too small of the carbonate ester compound may decrease the electrical conductivity of the electrolyte solution to thereby degrade the cycling characteristics. Containing too much of the carbonate ester compound may increase gas evolution.

The electrolyte solution of the present embodiment preferably further comprises a fluorinated ether compound represented by the following formula (3) (may be simply referred to as "fluorinated ether compound") as a non-aqueous electrolyte solvent.

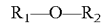  (3)

(in formula (3), $R_1$ and $R_2$, each independently, represent an alkyl group or fluorinated alkyl group, and at least one of $R_1$ and $R_2$ is a fluorinated alkyl group.)

By including the fluorinated ether, the viscosity of the electrolyte solution is lowered and the conductivity of the electrolyte solution is improved while the oxidation resistance of the electrolyte solution is maintained.

In formula (3), it is preferred that the total number of carbon atoms of $R_1$ and $R_2$ is 10 or less. Alkyl group or fluorinated alkyl group may be straight-chain or branched-chain.

In formula (3), $n_1$ that is the number of carbon atoms of $R_1$ and $n_2$ that is the number of carbon atoms of $R_2$ are preferably satisfy $1 \leq n_1 \leq 8$ and $1 \leq n_2 \leq 8$, respectively In formula (3), it is preferred that the total number of carbon atoms of $R_1$ and $R_2$ is 10 or less.

In formula (3), fluorinated alkyl groups are those in which preferably 50% or more, more preferably 60% or more, of hydrogen atoms in the corresponding unsubstituted alkyl group are substituted with fluorine atom(s). A large content of the fluorine atoms gives more remarkable improvement in voltage resistance, and therefore even when a positive electrode active material operating at a high potential is used, the deterioration of the battery capacity after cycles can be more effectively reduced.

Among the fluorinated ether compounds, a fluorinated ether compound represented by the following formula (3-1) is more preferable.

$$X^1\text{—}(CX^2X^3)_n\text{—}O\text{—}(CX^4X^5)_m\text{—}X^6 \tag{3-1}$$

(in formula (3-1), n and m, each independently, denote 1-8. $X^1$ to $X^6$ are each independently a fluorine atom or a hydrogen atom. However, at least one of $X^1$ to $X^3$ is a fluorine atom and at least one of $X^4$ to $X^6$ is a fluorine atom. Further, when n is 2 or more, a plurality of existing $X^2$ and $X^3$ are, in each case, independent to one another, and when m is 2 or more, a plurality of existing $X^4$ and $X^5$ are, in each case, independent to one another.)

The fluorinated ether compound is more preferably a compound represented by the following formula (3-2), from the viewpoint of the voltage resistance and compatibility with other electrolytes.

$$X^1\text{—}(CX^2X^3)_n\text{—}CH_2O\text{—}CX^4X^5\text{—}CX^6X^7\text{—}X^8 \tag{3-2}$$

(in formula (3-2), n is 1-7. $X^1$ to $X^8$ are each independently a fluorine atom or a hydrogen atom. However, at least one of $X^1$ to $X^3$ is a fluorine atom and at least one of $X^4$ to $X^8$ is a fluorine atom.)

In formula (3-2), when n is 2 or more, a plurality of existing $X^2$ may be the same or different from each other, and a plurality of existing $X^3$ may be the same or different from each other.

In addition, the fluorinated ether compound is more preferably a compound represented by the following formula (3-3), from the viewpoint of the voltage resistance and compatibility with other electrolytes.

$$H\text{—}(CY^1Y^2\text{—}CY^3Y^4)_n\text{—}CH_2O\text{—}CY^5Y^6\text{—}CY^7Y^8\text{—}H \tag{3-3}$$

In formula (3-3), n is 1, 2, 3 or 4. $Y^1$ to $Y^8$ are each independently a fluorine atom or a hydrogen atom. However, at least one of $Y^1$ to $Y^4$ is a fluorine atom and at least one of $Y^5$ to $Y^8$ is a fluorine atom.

In formula (3-3), when n is 2 or more, a plurality of existing $Y^1$ to $Y^4$ may be the same or different from each other.

The examples of fluorinated ether compounds include $CF_3OCH_3$, $CF_3OC_2H_5$, $F(CF_2)_2OCH_3$, $F(CF_2)_2OC_2H_5$, $CF_3(CF_2)CH_2O(CF_2)CF_3$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $(CF_3)(CF_2)CH_2O(CF_2)_2H$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CHF)_2CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2OCH_2(CF_2)_2F$, $CF_3CHFCF_2OCH_2CF_2CF_2H$, $H(CF_2)_4CH_2O(CF_2)_2H$, $CH_3CH_2O(CF_2)_4F$, $F(CF_2)_4CH_2O(CF_2)_2H$, $H(CF_2)_2CH_2OCF_2CHFCF_3$, $F(CF_2)_2CH_2OCF_2CHFCF_3$, $H(CF_2)_4CH_2O(CF_2)H$, $CF_3OCH_2(CF_2)_2$ $F$, $CF_3CHFCF_2OCH_2(CF_2)_3F$, $CH_3CF_2OCH_2(CF_2)_2F$, $CH_3CF_2OCH_2(CF_2)_3F$, $CH_3O(CF_2)_5F$, $F(CF_2)_3CH_2OCH_2(CF_2)_3F$, $F(CF_2)_2CH_2OCH_2(CF_2)_2F$, $H(CF_2)_2CH_2OCH_2(CF_2)_2H$, $CH_3CF_2OCH_2(CF_2)_2H$.

The content of the fluorinated ether compound in the non-aqueous electrolyte solvent may be 0% by volume, but it is preferably adjusted in the range of 5 or more and 90% by volume or less, more preferably 10% by volume or more, more preferably 15% by volume or more, more preferably 20% by volume or more, and further more preferably 30% by volume or more, and more preferably 80% by volume or less, and further more preferably 70% by volume or less. Containing too small of the fluorinated ether compound may result in the increase in the viscosity of the electrolyte solution, leading to the decrease in the electrical conductivity and drop in capacity in the cycles. Containing too much of fluorinated ether compound induces the decrease of the dielectric constant of the electrolyte solution and thereby the supporting electrolyte becomes impossible to dissociate, a drop in capacity may be occurred as well.

The fluorinated ether compound represented by formula (3) may be used alone or in mixture of two or more thereof.

In the present embodiment, a fluorinated phosphate ester represented by the following formula (A) (may be referred to simply as "fluorinated phosphate ester") may be contained as a non-aqueous solvent in the electrolyte solution.

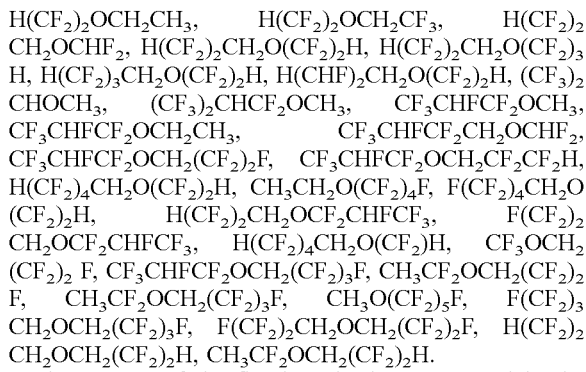

(A)

(in formula (A), $R^1$, $R^2$, and $R^3$ each independently represent substituted or unsubstituted alkyl group, and at least one of $R^1$, $R^2$, and $R^3$ is fluorine-substituted alkyl group. A carbon atom of $R^1$ and a carbon atom of $R^2$ may be bonded through a single bond or double bond to form a cyclic structure.)

In formula (A), $R^1$, $R^2$, and $R^3$ each independently and preferably have 1 to 3 carbon atoms. At least one of $R^1$, $R^2$, and $R^3$ is preferably fluorine-substituted alkyl group in which 50% or more of hydrogen atoms in the corresponding unsubstituted alkyl group are substituted with a fluorine atom. More preferably, all the $R^1$, $R^2$, and $R^3$ are fluorine-substituted alkyl group, and the $R^1$, $R^2$, and $R^3$ are fluorine-substituted alkyl group in which 50% or more of hydrogen atoms in the corresponding unsubstituted alkyl group are each substituted with a fluorine atom. This is because a large content of the fluorine atoms further increases the voltage resistance, and even when a positive electrode active material which operates at a potential of 4.5 V or higher versus lithium is used, it can further decrease capacity deterioration of the battery after cycling.

Examples of the fluorinated phosphate ester include, but are not particularly limited to, fluorinated alkyl phosphate ester compounds, such as tris (trifluoromethyl) phosphate, tris (pentafluoroethyl) phosphate, tris (2,2,2-trifluoroethyl)

phosphate (TTFP), tris (2,2,3,3-tetrafluoropropyl) phosphate, tris (3,3,3-trifluoropropyl) phosphate, and tris (2,2,3,3,3-pentafluoropropyl) phosphate. Among these, as the fluorinated phosphate ester compound, tris(2,2,2-trifluoroethyl) phosphate (TTFP) is preferred. The fluorinated phosphate ester may be used singly or in combination of two or more.

The content of the fluorinated phosphate ester in the non-aqueous electrolytic solvent may be 0% by volume, but it is preferably 10% by volume or more and 40% by volume or less, and more preferably 10% by volume or more and 30% by volume or less. By containing the fluorinated phosphate ester, the oxidation resistance of the electrolyte solution is improved and the gas generation under a high temperature can be suppressed.

Examples of the non-aqueous electrolytic solvent include, in addition to those described above, γ-lactones such as γ-butyrolactone, chain ethers such as 1,2-ethoxyethane (DEE) and ethoxymethoxyethane (EME), cyclic ethers such as tetrahydrofuran and 2-methyltetrahydrofuran, aprotic organic solvents such as dimethylsulfoxide, 1,3-dioxolane, formamide, acetamide, dimethylformamide, dioxolane, acetonitrile, propylnitrile, nitromethane, ethyl monoglyme, phosphate triester, trimethoxymethane, dioxolane derivatives, 1,3-dimethyl-2-imidazolidinone, 3-methyl-2-oxazolidinone, propylene carbonate derivatives, tetrahydrofuran derivatives, anisole, N-methylpyrrolidone, fluorinated carboxylate esters, cyclic sulfone compounds such as sulfolane and the like. These may be used singly or two or more of them may be used in mixture.

The electrolyte solution preferably contains lithium salt. Examples of the lithium salt include, but are not particularly limited to, $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_3$, $LiN(CF_3SO_2)_2$, $LiN(C_2F_5SO_2)_2$, $LiB_{10}Cl_{10}$, lithium lower aliphatic carboxylate, chloroborane lithium, lithium tetraphenylborate, LiCl, LiBr, LiI, LiSCN, and LiCl. The concentration of the lithium salt in the electrolyte solution is preferably from 0.5 to 1.5 mol/l. A concentration of the lithium salt in such ranges makes it easy to adjust the density, viscosity, electrical conductivity and the like within an appropriate range.

[Positive Electrode]

In this embodiment, the positive electrode active material may not be limited in particular, and any known materials may be used as long as the insertion of lithium ions during charging and the desorption thereof during discharge can be performed.

Examples of the positive electrode active material include:

lithium manganates having a laminate structure or a spinel structure such as $LiMnO_2$ and $Li_xMn_2O_4$ (0<x<2);

$LiCoO_2$, $LiNiO_2$ or those obtained by replacing a part of these transition metals of these with another metal;

lithium transition metal oxides in which a particular transition metal does not exceed a half such as $LiNi_{1/3}Co_{1/3}Mn_{1/3}O_2$;

those having an olivine structure such as $LiFePO_4$; and those containing Li in an amount excessively larger than the stoichiometric composition (amount) in these lithium transition metal oxides. Particularly, $Li_\alpha Ni_\beta Co_\gamma Al_\delta O_2$ (1≤α≤1.2, α+β+γ+δ=2, β≥0.7, γ≤0.2) or $Li_\alpha Ni_\beta Co_\gamma Mn_\delta O_2$ (1≤α≤1.2, α+β+γ+δ=2, β≥0.6, γ≤0.2) is preferable. The materials can be used alone or in combination of two types or more.

In the present embodiment, the positive electrode preferably has a charge/discharge region at 4.5 V or higher versus lithium. Therefore, as the positive electrode active material, those capable of absorbing and desorbing lithium at a potential of 4.5V or higher versus metal lithium counter electrode are preferable, and the use of a lithium-containing complex oxide having a plateau at a potential of 4.5V or higher versus metal lithium counter electrode is more preferable. Due to the effect of inhibiting the decomposition of the electrolyte solution at high voltages, the effect of the present embodiment can be exhibited more remarkably.

As the positive electrode active material which operates at a potential of 4.5 V or higher, a spinel-type lithium-manganese composite oxide represented by the following formula (4) can be used, for example.

$$Li_a(M_xMn_{2-x-y}Y_y)(O_{4-w}Z_w) \quad (4)$$

(in formula (4), 0.4≤x≤1.2, 0≤y, x+y<2, 0≤a≤1.2, 0≤w≤1. M is at least one selected from the group consisting of Co, Ni, Fe, Cr, and Cu. Y is at least one selected from the group consisting of Li, B, Na, Mg, Al, Ti, Si, K, and Ca. Z is at least one of F and Cl.)

As the lithium manganese composite oxides represented by formula (4), preferable examples thereof include $LiNi_{0.5}Mn_{1.5}O_4$, $LiCrMnO_4$, $LiFeMnO_4$, $LiCoMnO_4$, and $LiCu_{0.5}Mn_{1.5}O_4$. These positive electrode active materials have a high capacity.

The positive electrode active material which operates at a potential of 4.5 V or higher is preferably a lithium manganese composite oxide represented by the following formula (7) from the viewpoint of obtaining sufficient capacity and extending the life time.

$$LiNi_xMn_{2-x-y}A_yO_4 \quad (7)$$

(in formula (4-1), 0.4<x<0.6, 0≤y<0.3, and A is at least one selected from Li, B, Na, Mg, Al, Ti, and Si.)

Furthermore, examples of the olivine-type positive electrode active material which operates at a potential of 4.5 V or higher include those represented by the following formula (5).

$$LiMPO_4 \quad (5)$$

(in formula (5), M is at least one of Co and Ni.),

Among the olivine-type positive electrode active materials, $LiCoPO_4$, $LiNiPO_4$ and the like are preferable.

In addition, as a positive electrode active material which operates at a potential of 4.5 V or higher, Si composite oxides are also raised, including those represented by the following formula (10), for example.

$$Li_2MSiO_4 \quad (10)$$

(in formula (10), M is at least one selected from the group consisting of Mn, Fe and Co.)

In addition, the positive electrode active material which operates at a potential of 4.5 V or higher also includes those having a layer structure, including those represented by the following formula (6), for example.

$$Li(Li_xM_{1-x-z}Mn_z)O_2 \quad (6)$$

(in formula (6), $0 \leq x < 0.3$ and $0.3 \leq z \leq 0.7$, and M is at least one selected from Co, Ni, and Fe.)

A positive electrode can be formed by, for example, mixing a positive electrode active material, an electric conductivity imparting agent, and a positive electrode binder to prepare a positive electrode slurry and coating the slurry on a current collector, for example.

Examples of the electric conductivity-imparting agent include metal material such as Al, and electrical conductive oxide powder, in addition to carbon materials such as acetylene black, carbon black, fibrous carbon, and graphite.

Examples of the positive electrode binder which can be used include, but are not particularly limited to, polyvinylidene fluoride (PVdF), vinylidene fluoride-hexafluoropropylene copolymers, vinylidene fluoride-tetrafluoroethylene copolymer, styrene-butadiene copolymerized rubber, polytetrafluoroethylene, polypropylene, polyethylene, polyimide, and polyamide-imide.

The content of the electric conductivity-imparting agent may be, for example, from 1 to 10% by mass based on the mass of the positive electrode active material. The content of the binder may be, for example, from 1 to 10% by mass based on the mass of the positive electrode active material. Within such ranges, it is easy to secure a sufficient proportion of the active material in the electrode and to obtain sufficient capacity per unit mass.

Examples of the positive electrode current collector preferably include, but are not particularly limited to, aluminum, nickel, copper, silver, and alloys thereof from the viewpoint of electrochemical stability. Examples of the shape include foil, plate, and mesh shapes.

[Negative Electrode]

The negative electrode active materials are not particularly limited as long as they can absorb and release lithium ions, and known materials can be used. Specific examples of the negative electrode active material include carbon materials such as graphite, coke, and hard carbon, lithium alloys such as lithium-aluminum alloys, lithium-lead alloys, and lithium-tin alloys, lithium metal, Si, and metal oxides having a potential less noble than that of the positive electrode active material, such as $SnO_2$, SnO, $TiO_2$, $Nb_2O_3$, and SiO.

A negative electrode can be formed by, for example, mixing a negative electrode active material, an negative electrode binder and, if needed, an electric conductivity imparting agent, to prepare a negative electrode slurry and coating the slurry on a negative electrode current collector, for example.

Examples of the electric conductivity imparting agent include carbon materials and electrical conductive oxide powder.

Examples of the negative electrode binder which can be used include, but are not particularly limited to, polyvinylidene fluoride, vinylidene fluoride-hexafluoropropylene copolymers, vinylidene fluoride-tetrafluoroethylene copolymer, styrene-butadiene copolymerized rubber (SBR), polytetrafluoroethylene, polypropylene, polyethylene, polyimide, polyamide-imide, and polyacrylic acid. Among these, polyimide or polyamide imide is preferred because binding properties thereof is strong. When using a styrene-butadiene copolymer rubber (SBR) that is a water-dispersible binder, carboxymethyl cellulose (CMC) as a thickener may be used in combination.

The amount of the negative electrode binder used is preferably from 5 to 25 parts by mass based on 100 parts by mass of the negative electrode active material from the viewpoint of a trade-off relationship between "a sufficient binding power" and "a higher energy".

The negative electrode current collector is not particularly limited, but examples thereof preferably include aluminum, nickel, stainless, chromium, copper, silver, and alloys thereof from the viewpoint of electrochemical stability. Examples of the shape include foil, plate, and mesh shapes.

Examples of the method for forming a negative electrode active material layer include doctor blade methods, die coater methods, CVD methods, and sputtering methods. After a negative electrode active material layer is formed in advance, a thin film of aluminum, nickel, or alloys thereof may be formed by a method such as vapor deposition and sputtering to provide a negative electrode.

[Separator]

The separator is not particularly limited, and known materials can be used. Examples of the separator that can be used specifically include polyolefin microporous films such as polyethylene and polypropylene, and those containing cellulose and glass fiber.

[Outer Package]

The outer package may be appropriately selected and used as long as it is stable to the electrolyte solution and has sufficient water vapor barrier properties. For example, in the case of a layer laminate secondary battery, examples of the outer package that can be used include laminate films, such as polypropylene and polyethylene on which aluminum or silica is coated. Particularly, from the viewpoint of suppressing volume expansion, aluminum laminate films are preferably used.

[Secondary Battery]

The secondary battery can have a configuration in which, for example, a positive electrode having a positive electrode active material, a negative electrode having a negative electrode active material, a separator sandwiched between the positive electrode and the negative electrode as an insulator, and an electrolyte solution having lithium-ion conductivity are sealed in an outer package. Application of an electric voltage across the positive electrode and negative electrode allows the positive electrode active material to release lithium ions and the negative electrode active material to absorb the lithium ions, and thus, the battery will be in a charged state. A discharged state is a state opposite to the charged state.

Examples of the shape of the battery include cylindrical, rectangular, coin, button, and laminate shapes. Examples of the battery outer package include stainless, iron, aluminum, titanium, or alloys of two or more of these, or plated products thereof. Examples of the plating that may be used include nickel plating.

The secondary battery can be produced as follows, for example, under a dried air or inert gas atmosphere, a laminate of a negative electrode and a positive electrode with a separator sandwiched therebetween, or the wound laminate is placed in an outer package such as a can case, an electrolyte solution is injected into the outer package, and then the outer package is sealed with a flexible film made of a laminate of synthetic resin and metal foils, for example.

The configuration of the secondary battery is not particularly limited, for example, the battery can take a configuration of a winding type in which a positive electrode and a negative electrode with a separator sandwiched therebetween so as to be faced with each other are wound, or a lamination type in which the positive electrode, the negative electrode and the separator are laminated.

The FIGURE shows a laminate-type secondary battery as an example of the secondary battery. A separator 5 is sandwiched between a positive electrode which is formed of a positive electrode active material layer 1 containing a positive electrode active material and a positive electrode current collector 3, and a negative electrode which is formed of a negative electrode active material layer 2 and a negative electrode current collector 4. The positive electrode current collector 3 is connected with a positive electrode lead terminal 8, and the negative electrode current collector 4 is connected with an negative electrode lead terminal 7. An outer package laminate 6 is used for the outer package, and the inside of the secondary battery is filled with an electrolyte solution.

Examples of the laminate resin film used in laminate types include aluminum, aluminum alloy, and titanium foil. Examples of the material for the heat-welding portions of the metal laminate resin film include themoplastic polymer materials such as polyethylene, polypropylene, and polyethylene terephthalate. Further, each metal laminate resin layer and metal foil layer is not limited to one layer, but they may be two or more layers.

A method of manufacturing a secondary battery according to the present embodiment is not particularly limited, but the following method is raised as an example. A positive electrode tab and a negative electrode tab are connected to a positive electrode and a negative electrode for secondary batteries, respectively through a positive electrode current collector and a negative electrode current collector. The positive electrode and the negative electrode are disposed and laminated so as to oppose to each other with a separator sandwiched therebetween, to produce an electrode element. The electrode element is housed in an outer package, and immersed in an electrolyte solution. The outer package is sealed so that portions of the positive electrode tab and the negative electrode tab project to the outside, to produce a secondary battery.

EXAMPLES

Hereinbelow, examples of the present embodiment will be described in details, but the present embodiment is not intended to be limited to the following examples.

Abbreviations used in the following Examples will be described.
DMS: $CH_3SO_2CH_3$ (dimethyl sulfone)
DES: $CH_3CH_2SO_2CH_2CH_3$ (diethyl sulfone)
EC: ethylene carbonate
PC: propylene carbonate
FEC: 4-fluorinated ethylene carbonate
DMC: dimethyl carbonate
FE1: fluorinated ether represented by $H(CF_2)_2CH_2O(CF_2)_2H$
EMS: ethyl methyl sulfone
iPMS: isopropyl methyl sulfone
EiPS: ethyl isopropyl sulfone
DPS: dipropyl sulfone
iPiBS: isopropyl isobutyl sulfone
TTFP: fluorinated phosphate ester represented by $O=P(OCH_2CF_3)_3$ Example 1

(Production of a Positive Electrode)

First, powders of $MnO_2$, $NiO$, $Li_2CO_3$, and $TiO_2$ were weighed so as to be the intended composition ratio, and were crushed and mixed. Subsequently, the mixed powder was calcined at 750° C. for 8 hours to produce $LiNi_{0.5}Mn_{1.37}Ti_{0.13}O_4$. This positive electrode active material was confirmed to have a nearly single-phase spinel structure. The produced positive electrode active material and a carbon black which is an electric conductivity imparting agent were mixed, and the mixture was dispersed in a solution of polyvinylidene fluoride (PVDF) which is dissolved in N-methylpyrrolidone and serves as a binder to thereby prepare a positive electrode slurry. The mass ratio of the positive electrode active material, the electric conductivity imparting agent, and the positive electrode binder was 91/5/4. The positive electrode slurry was uniformly applied on the both sides of a current collector formed of Al. Subsequently, the current collector was dried in vacuum for 12 hours and was subjected to a compression-molding by a roll press to thereby produce a positive electrode. Herein, the weight of the positive electrode active material layer per unit area after drying was set to 0.040 $g/cm^2$.

(Production of a Negative Electrode)

Graphite as a negative electrode active material, carbon black as an electric conductivity imparting agent, SBR (styrene-butadiene copolymer rubber) as a binder and CMC (carboxymethylcellulose) as a thickening agent were mixed at a mass ratio of 97.5:0.5:1:1 in deionized water, kneaded and dispersed to prepare a slurry. The slurry was uniformly applied on the both sides of a Cu current collector. Subsequently, the current collector was dried in vacuum for 12 hours and was subjected to a compression-molding by a roll press to thereby produce a negative electrode. Herein, the weight of the negative electrode active material layer per unit area after drying was set to 0.015 $g/cm^2$.

(Non-Aqueous Electrolyte Solution)

$CH_3SO_2CH_3$ (dimethyl sulfone (DMS)), EiPS (ethyl isopropyl sulfone) and ethylene carbonate (EC) were mixed at a ratio of DMS:EiPS:EC=10:40:50 (volume ratio) to prepare a non-aqueous solvent. A non-aqueous electrolyte solution was prepared by dissolving $LiPF_6$ at a concentration of 1.0 mol/L as an electrolyte.

(Production of a Laminate-Type Battery)

The positive electrode and the negative electrode were cut into 1.5 cm×3 cm. The five positive electrode layers and six negative electrode layers obtained were alternately laminated with polypropylene porous films sandwiched therebetween as a separator. The ends of the positive electrode current collector not covered with the positive electrode active material and the ends of the negative electrode current collector not covered with the negative electrode active material were each welded, and a positive electrode terminal made of aluminum and a positive electrode terminal made of nickel were welded to the welded parts to thereby obtain an electrode element having a flat laminate structure. The electrode element described above was enclosed with an aluminum laminate film that serves as an outer package, then electrolyte solution was injected into the internal of outer package, subsequently the outer package was sealed under reduced pressure to thereby produce a secondary battery.

(High Temperature Cycle Test)

High temperature cycling characteristics were evaluated on the batteries produced as described above. A cycle including charging a battery at 1 C to 4.8 V and carrying out constant voltage charge for a total of 2.5 hours and then carrying out constant current discharge at 1 C to 3.0 V was repeated 200 times at 55° C. The proportion of the discharge capacity after 200 cycles to the initial discharge capacity was determined as the capacity retention.

(Evaluation of Gas Evolution)

The amount of gas evolved was evaluated by measuring the change in the battery volume after the charge/discharge cycles. The cell volume was measured using the Archimedean method, and the difference before and after the charge/discharge cycles was examined to thereby calculate a cell expansion ratio.

cell expansion ratio (%)=100×(cell volume after 200 cycles at 55° C.−cell volume before charge/discharge)/(cell volume before charge/discharge)

Example 2

(Non-Aqueous Electrolyte Solution)

$CH_3SO_2CH_3$ (dimethyl sulfone (DMS)) and $CH_3CH_2SO_2CH_2CH_3$ (diethyl sulfone (DES)) as two open chain sulfone compounds, ethylene carbonate (EC) and a fluorinated ether represented by $H(CF_2)_2CH_2O(CF_2)_2H$ (FE1) were mixed at a ratio of DMS:DES:EC:FE1=10:20:20:50 (volume ratio) to prepare a non-aqueous solvent. A non-aqueous electrolyte solution was prepared by dissolving $LiPF_6$ at a concentration of 1.0 mol/L as an electrolyte.

A secondary battery was produced as in Example 1 except that the composition of the non-aqueous electrolyte solution was set as described above.

Examples 3 to 13, Comparative Examples 1 and 2

Batteries were produced as in Example 1 except that the composition of the solvents in the non-aqueous electrolyte solutions were set as described in Table 1. The composition ratio in Table 1 (A/B/C/D) is denoted by volume ratio.

Table 1 shows compositions of solvents of Examples 1 to 13 and Comparative Examples 1 and 2, capacity retention ratios and volume increase ratio (cell expansion ratio) after 200 cycles at 55° C.

The lithium secondary batteries of Examples 1 to 13 and Comparative Examples 1 and 2 contain positive electrodes that operate at a potential of 4.5V or higher versus lithium. In these cases, as shown in Comparative Examples 1 and 2, when using the electrolyte solution containing only one open chain sulfone, the properties of the capacity retention ratio and the volume increase ratio (cell expansion ratio) were not satisfied simultaneously. On the other hand, as shown in Examples 1-13, it was found that in the cases of lithium secondary batteries including electrolyte solutions containing at least two sulfone compounds and a carbonate ester compound, the capacity retention ratio was maintained in the cycle test at high temperature of 55° C., and at the same time the volume increase due to gas evolution was suppressed. Further, it was found that the lithium secondary batteries of Examples 2 to 13 using the electrolyte solutions containing also a fluorinated ether compound have better capacity retention ratio at high temperature.

Examples 14 to 28

Batteries were produced as in Example 1 except that non-aqueous electrolyte solutions containing solvents having compositions, open chain sulfone compounds (2 compounds)/carbonate ester compound/fluorinated compound (fluorinated ether or fluorinated phosphate ester compound), as described in Table 2 were used. In Table 2, TTFP is a fluorinated phosphate ester compound represented by O=P$(OCH_2CF_3)_3$. Table 2 shows the results of performing the evaluation as in Example 1

TABLE 1

| | open chain sulfone compound | carbonate ester compound | fluorinated ether compound | composition ratio (vol. ratio) | cycle at 55° C. capacity retention ratio | cycle at 55° C. cell expansion ratio |
|---|---|---|---|---|---|---|
| | A | B | C | D | A/B/C/D | (%) | (%) |
| Com-Ex. 1 | DMS | | EC | FE1 | 30/0/20/50 | 66.5 | 23.3 |
| Com-Ex. 2 | DES | | EC | FE1 | 30/0/20/50 | 62.3 | 17.2 |
| Ex. 1 | DMS | EiPS | EC | | 10/40/50/0 | 62.8 | 6.0 |
| Ex. 2 | DMS | DES | EC | FE1 | 10/20/20/50 | 67 | 12.0 |
| Ex. 3 | DMS | EMS | EC | FE1 | 10/20/20/50 | 68.2 | 14.1 |
| Ex. 4 | DMS | iPMS | EC | FE1 | 10/20/20/50 | 66.9 | 8.2 |
| Ex. 5 | DMS | EiPS | EC | FE1 | 10/20/20/50 | 66.6 | 9.7 |
| Ex. 6 | DMS | DPS | EC | FE1 | 10/20/20/50 | 66.3 | 10.9 |
| Ex. 7 | DMS | iPiBS | EC | FE1 | 10/20/20/50 | 63.2 | 7.9 |
| Ex. 8 | EMS | DES | EC | FE1 | 10/20/20/50 | 67.1 | 9.0 |
| Ex. 9 | EMS | iPMS | EC | FE1 | 10/20/20/50 | 65.6 | 7.6 |
| Ex. 10 | EMS | EiPS | EC | FE1 | 10/20/20/50 | 66 | 5.3 |
| Ex. 11 | EMS | DPS | EC | FE1 | 10/20/20/50 | 65.9 | 7.2 |
| Ex. 12 | DES | EiPS | EC | FE1 | 10/20/20/50 | 65.3 | 5.5 |
| Ex. 13 | DES | DPS | EC | FE1 | 10/20/20/50 | 64.9 | 6.7 |

Ex.: Example,
Com-Ex.: Comparative Example

TABLE 2

| | open chain sulfone compound | | carbonate ester compound | fluorinated compound | composition ratio (vol. ratio) | cycle at 55° C. | |
|---|---|---|---|---|---|---|---|
| | | | | | | capacity retention ratio | cell expansion ratio |
| | A | B | C | D | A/B/C/D | (%) | (%) |
| Ex. 14 | DMS | DES | EC | FE1 | 5/5/20/70 | 65.5 | 9.3 |
| Ex. 15 | DMS | DES | EC | FE1 | 5/5/30/60 | 66.3 | 10.7 |
| Ex. 16 | DMS | DES | EC | FE1 | 5/5/40/50 | 66.9 | 11.2 |
| Ex. 17 | DMS | DES | EC | FE1 | 5/5/50/40 | 66.8 | 10.3 |
| Ex. 18 | DMS | DES | EC | FE1 | 10/10/20/60 | 67 | 11.6 |
| Ex. 19 | DMS | DES | EC | FE1 | 10/20/30/40 | 67.5 | 11.1 |
| Ex. 20 | DMS | DES | EC | FE1 | 25/5/20/50 | 67.7 | 14.1 |
| Ex. 21 | DMS | DES | EC | FE1 | 20/10/20/50 | 66.8 | 12.5 |
| Ex. 22 | DMS | DES | EC | FE1 | 15/15/20/50 | 66.5 | 11.1 |
| Ex. 23 | DMS | DES | EC | FE1 | 5/25/20/50 | 67.3 | 10.3 |
| Ex. 24 | DMS | EiPS | EC | FE1 | 10/10/10/70 | 64.1 | 12.5 |
| Ex. 25 | DMS | EiPS | EC | FE1 | 10/30/30/30 | 66.5 | 9.3 |
| Ex. 26 | DMS | EiPS | EC | FE1 | 20/30/30/20 | 66.2 | 10.7 |
| Ex. 27 | DMS | EiPS | EC | FE1/TTFP | 10/10/10/(40/30) | 66.8 | 8.7 |
| Ex. 28 | DMS | DES | EC | FE1/TTFP | 2/3/20/(50/25) | 65.9 | 7.5 |

As in Examples 14-28, good cycle characteristics were achieved and cell expansion ratios were suppressed even in secondary batteries in which the composition ratios were changed with respect to two open chain sulfone compounds, carbonate ester compound and fluorinated ether compound in the electrolyte solutions. When the electrolyte solution of the secondary battery contains open chain sulfone compounds having different number of carbon atoms, it has been found that if the content of the open chain sulfone compound having more carbon atoms is larger than the content of the open chain sulfone compound having less carbon atoms, greater suppression effect on cell expansion ratio is obtained. Further, it has been found that electrolyte solutions further containing a fluorinated phosphate ester compound show excellent characteristics.

Examples 29 to 35

Batteries were produced as in Example 1 except that non-aqueous electrolyte solutions were set as described in Table 3 by using open chain sulfone compounds, a carbonate ester compound and a fluorinated compound as shown in Table 3. In Examples 33-35, as carbonate ester compounds, PC (propylene carbonate), FEC (4-fluorinated ethylene carbonate) or DMC (dimethyl carbonate) was used in addition to EC. The secondary batteries were prepared in the same manner as in Example 1, and the results of evaluation were shown in Table 3.

TABLE 3

| | open chain sulfone compound | | | carbonate ester compound | | fluorinated ether compound | composition ratio (vol. ratio) | cycle at 55° C. | |
|---|---|---|---|---|---|---|---|---|---|
| | | | | | | | | capacity retention ratio | cell expansion ratio |
| | A | B | C | D | E | F | A/B/C/D/E/F | (%) | (%) |
| Ex. 29 | DMS | EiPS | | EC | PC | | 10/30/0/40/10/0 | 64.0 | 5.8 |
| Ex. 30 | DMS | DES | EiPS | EC | | FE1 | 5/5/10/30/0/50 | 67.1 | 8.7 |
| Ex. 31 | DMS | DES | | EC | PC | FE1 | 10/20/0/10/10/50 | 66.9 | 7.4 |
| Ex. 32 | DMS | DES | | EC | PC | FE1 | 10/10/0/10/20/50 | 66.1 | 5.8 |
| Ex. 33 | DMS | EiPS | | EC | PC | FE1 | 10/20/0/10/10/50 | 65.7 | 3 |
| Ex. 34 | DMS | EiPS | | EC | FEC | FE1 | 10/20/0/18/2/50 | 66.9 | 6.8 |
| Ex. 35 | DMS | EiPS | | EC | DMC | FE1 | 10/20/0/18/2/50 | 67.3 | 9.3 |

As shown in Table 3, in the case that three open chain sulfone compounds are mixed (Example 30) and in the case that two carbonate ester compounds were used in combination (Examples 29 and 31 to 35), the suppression of gas generation and good cycle characteristics have been achieved.

Examples 37 to 57

Batteries were produced as in Example 2 except that fluorinated ether compounds shown in Table 4 were used as a non-aqueous electrolyte solvent. The evaluation was made as in Example 1 and the results were shown in Table 4.

TABLE 4

| | non-aqueous electrolyte solvent | | | | cycle at 55° C. | |
|---|---|---|---|---|---|---|
| | open chain sulfone compound | carbonate ester compound | fluorinated ether compound | composition ratio (vol. ratio) | capacity retention ratio | cell expansion ratio |
| | A | B | C | D | (A/B/C/D) | (%) | (%) |
| Ex. 2 | DMS | DES | EC | H(CF$_2$)$_2$CH$_2$O(CF$_2$)$_2$H | 10/20/20/50 | 67 | 12.0 |
| Ex. 37 | DMS | DES | EC | CH$_3$CH$_2$O(CF$_2$)$_4$F | 10/20/20/50 | 65.5 | 12.8 |
| Ex. 38 | DMS | DES | EC | F(CF$_2$)$_4$CH$_2$O(CF$_2$)$_2$H | 10/20/20/50 | 64.3 | 11 |
| Ex. 39 | DMS | DES | EC | CF$_3$CHFCF$_2$OCH$_2$(CF$_2$)$_2$F | 10/20/20/50 | 66.1 | 10.5 |
| Ex. 40 | DMS | DES | EC | H(CHF)$_2$CH$_2$O(CF$_2$)$_2$H | 10/20/20/50 | 63 | 12.5 |
| Ex. 41 | DMS | DES | EC | (CF$_3$)(CF$_2$)CH$_2$O(CF$_2$)$_2$H | 10/20/20/50 | 63.4 | 8.9 |
| Ex. 43 | DMS | DES | EC | H(CF$_2$)$_3$CH$_2$O(CF$_2$)$_2$H | 10/20/20/50 | 64.7 | 7.6 |
| Ex. 44 | DMS | DES | EC | CF$_3$(CF$_2$)CH$_2$O(CF$_2$)CF$_3$ | 10/20/20/50 | 63.4 | 5.9 |
| Ex. 45 | DMS | DES | EC | F(CF$_2$)$_4$OC$_2$H$_5$ | 10/20/20/50 | 63.1 | 7.9 |
| Ex. 46 | DMS | DES | EC | H(CF$_2$)$_2$CH$_2$OCF$_2$CHFCF$_3$ | 10/20/20/50 | 61.9 | 10.6 |
| Ex. 47 | DMS | DES | EC | F(CF$_2$)$_2$CH$_2$OCF$_2$CHFCF$_3$ | 10/20/20/50 | 60.4 | 10.8 |
| Ex. 48 | DMS | DES | EC | H(CF$_2$)$_4$CH$_2$O(CF$_2$)H | 10/20/20/50 | 59.5 | 9.4 |
| Ex. 49 | DMS | DES | EC | CF$_3$OCH$_2$(CF$_2$)$_2$F | 10/20/20/50 | 59.9 | 8.6 |
| Ex. 50 | DMS | DES | EC | CF$_3$CHFCF$_2$OCH$_2$(CF$_2$)$_3$F | 10/20/20/50 | 63.8 | 7.7 |
| Ex. 51 | DMS | DES | EC | CH$_3$CF$_2$OCH$_2$(CF$_2$)$_2$F | 10/20/20/50 | 62.7 | 10.9 |
| Ex. 52 | DMS | DES | EC | CH$_3$CF$_2$OCH$_2$(CF$_2$)$_3$F | 10/20/20/50 | 61.5 | 11.9 |
| Ex. 53 | DMS | DES | EC | CH$_3$O(CF$_2$)$_5$F | 10/20/20/50 | 59.2 | 12.2 |
| Ex. 54 | DMS | DES | EC | F(CF$_2$)$_3$CH$_2$OCH$_2$(CF$_2$)$_3$F | 10/20/20/50 | 61 | 10.7 |
| Ex. 55 | DMS | DES | EC | F(CF$_2$)$_2$CH$_2$OCH$_2$(CF$_2$)$_2$F | 10/20/20/50 | 62.6 | 9.8 |
| Ex. 56 | DMS | DES | EC | H(CF$_2$)$_2$CH$_2$OCH$_2$(CF$_2$)$_2$H | 10/20/20/50 | 63.7 | 12.4 |
| Ex. 57 | DMS | DES | EC | CH$_3$CF$_2$OCH$_2$(CF$_2$)$_2$H | 10/20/20/50 | 61.3 | 12.7 |

As shown in Table 4, even when the kinds of fluorinated ether were changed, suppression of gas generation and excellent cycle characteristics are achieved.

Examples 58 to 70, Comparative Example 3

Positive electrode active materials shown in Table 5 were prepared. Using these positive electrode active materials, batteries were produced as in Example 1 except that solvents shown in Table 5 were used. High-temperature cycle test of the secondary batteries fabricated in Examples 58-65 was carried out in the same manner as in Example 1. High-temperature cycle test of the secondary battery fabricated in Examples 66-70 and Comparative Example 3 was performed as in Example 1, except that charging was performed at 1 C up to 4.2 V

TABLE 5

| | positive electrode active material | composition of mixed solvent | | retention ratio at cycle at 55° C. (%) |
|---|---|---|---|---|
| Ex. 2 | LiNi$_{0.5}$Mn$_{1.37}$Ti$_{0.13}$O$_4$ | DMS/DES/EC/FE1 | 20/10/20/50 | 67.0 |
| Ex. 58 | LiNi$_{0.5}$Mn$_{1.3}$Ti$_{0.2}$O$_4$ | DMS/DES/EC/FE1 | 20/10/20/50 | 68.0 |
| Ex. 59 | LiNi$_{0.5}$Mn$_{1.45}$Ti$_{0.15}$Fe$_{0.05}$O$_4$ | DMS/DES/EC/FE1 | 20/10/20/50 | 67.2 |
| Ex. 60 | LiNi$_{0.5}$Mn$_{1.45}$Li$_{0.05}$O$_4$ | DMS/DES/EC/FE1 | 20/10/20/50 | 66.1 |
| Ex. 61 | LiNi$_{0.5}$Mn$_{1.45}$Al$_{0.05}$O$_{3.95}$F$_{0.05}$ | DMS/DES/EC/FE1 | 20/10/20/50 | 66.7 |
| Ex. 62 | LiNi$_{0.5}$Mn$_{1.5}$O$_4$ | DMS/DES/EC/FE1 | 20/10/20/50 | 65.6 |
| Ex. 63 | LiNi$_{0.25}$Fe$_{0.25}$Mn$_{1.5}$O$_4$ | DMS/DES/EC/FE1 | 20/10/20/50 | 63.1 |
| Ex. 64 | LiCoPO$_4$ | DMS/DES/EC/FE1 | 20/10/20/50 | 61.2 |
| Ex. 65 | Li(Li$_{0.15}$Ni$_{0.2}$Mn$_{0.65}$)O$_2$ | DMS/DES/EC/FE1 | 20/10/20/50 | 60.7 |
| Com-Ex. 3 | LiMn$_{1.9}$Al$_{0.1}$O$_4$ | DES/EC/FE1 | 30/20/50 | 66.7 |
| Ex. 66 | LiMn$_{1.9}$Al$_{0.1}$O$_4$ | DMS/DES/EC/FE1 | 20/10/20/50 | 71.9 |
| Ex. 67 | LiCoO$_2$ | DMS/DES/EC/FE1 | 20/10/20/50 | 73.0 |
| Ex. 68 | LiNiO$_2$ | DMS/DES/EC/FE1 | 20/10/20/50 | 72.5 |
| Ex. 69 | LiNi$_{1/3}$Co$_{1/3}$Mn$_{1/3}$O$_2$ | DMS/DES/EC/FE1 | 20/10/20/50 | 74.1 |
| Ex. 70 | LiFePO$_4$ | DMS/DES/EC/FE1 | 20/10/20/50 | 69.7 |

As shown in Table 5, even when the kinds of the positive electrode active material were changed, excellent high-temperature cycle characteristics were obtained.

As shown above, according to the configuration of the present embodiment, a lithium secondary battery can be obtained in which gas generation was improved while maintaining a high-temperature cycle characteristics.

INDUSTRIAL APPLICABILITY

The present embodiment can be used, for example, in various industrial fields requiring power supply and the industrial fields of transporting, storing and supplying electric energy. Specifically, the present embodiment can be used as a power supply for mobile equipment such as mobile telephones and note PCs; a power supply for transfer and transportation medium for electric trains, satellites and submarines including electric vehicles such as electric cars, hybrid cars, electric motorcycles and electric assist bicycles; backup power supply such as UPS; and storage equipment for storing electric power obtained by photovoltaic power generation and wind-generated electricity.

REFERENCE SIGNS LIST

1: positive electrode active material layer
2: negative electrode active material layer
3: positive electrode current collector
4: negative electrode current collector
5: separator
6: outer package laminate
7: negative electrode lead terminal
8: positive electrode lead terminal

The invention claimed is:

1. An electrolyte solution for a secondary battery comprising a non-aqueous electrolyte solvent comprising:
    at least one open chain sulfone compound having 4 or more carbon atoms selected from the group consisting of ethyl isopropyl sulfone, diethyl sulfone, isopropyl methyl sulfone, isopropyl isobutyl sulfone and dipropyl sulfone;
    at least one open chain sulfone compound having 3 or less carbon atoms selected from the group consisting of dimethyl sulfone and ethyl methyl sulfone;
    one or more carbonate ester compounds selected from the group consisting of ethylene carbonate, propylene carbonate, 4-fluorinated ethylene carbonate and dimethyl carbonate, wherein the carbonate ester compound comprises at least ethylene carbonate; and
    at least one fluorinated ether compound selected from the group consisting of H(CF$_2$)$_2$CH$_2$O(CF$_2$)$_2$H, CH$_3$CH$_2$O(CF$_2$)$_4$F, F(CF$_2$)$_4$CH$_2$O(CF$_2$)$_2$H, CF$_3$CHFCF$_2$OCH$_2$(CF$_2$)$_2$F, H(CHF)$_2$CH$_2$O(CF$_2$)$_2$H, (CF$_3$)(CF$_2$)CH$_2$O(CF$_2$)$_2$H, H(CF$_2$)$_3$CH$_2$O(CF$_2$)$_2$H, CF$_3$(CF$_2$)CH$_2$O(CF$_2$)CF$_3$, F(CF$_2$)$_4$OC$_2$H$_5$, H(CF$_2$)$_2$CH$_2$OCF$_2$CHFCF$_3$, F(CF$_2$)$_2$CH$_2$OCF$_2$CHFCF$_3$, H(CF$_2$)$_4$CH$_2$O(CF$_2$)H, CF$_3$OCH$_2$(CF$_2$)$_2$F, CF$_3$CHFCF$_2$OCH$_2$(CF$_2$)$_3$F, CH$_3$CF$_2$OCH$_2$(CF$_2$)$_2$F, CH$_3$CF$_2$OCH$_2$(CF$_2$)$_3$F, CH$_3$O(CF$_2$)$_5$F, F(CF$_2$)$_3$CH$_2$OCH$_2$(CF$_2$)$_3$F, F(CF$_2$)$_2$CH$_2$OCH$_2$(CF$_2$)$_2$F, H(CF$_2$)$_2$CH$_2$OCH$_2$(CF$_2$)$_2$H and CH$_3$CF$_2$OCH$_2$(CF$_2$)$_2$H,
    wherein the content of the fluorinated ether compound in the non-aqueous electrolyte solvent is from 40 to 50 vol %;
    the total content of the open-chain sulfone compounds in the non-aqueous electrolyte solvent is from 20 to 30 vol %;
    the content of the carbonate ester compound in the non-aqueous electrolyte solvent is from 20 to 30 vol %; and
    the content of the open chain sulfone compound having 4 or more carbon atoms is larger than the content of the open chain sulfone compound having 3 or less carbon atoms; and
    the content of the open-chain sulfone compound having 4 or more carbon atoms in the non-aqueous electrolyte solvent is from 3 to 25 vol % and the content of the open-chain sulfone compound having 3 or less carbon atoms in the non-aqueous electrolyte solvent is from 2 to 10 vol %.

2. The electrolyte solution for a secondary battery according to claim 1, wherein the non-aqueous electrolyte solvent comprises ethylene carbonate and at least one carbonate ester compounds selected from the group consisting of propylene carbonate, 4-fluorinated ethylene carbonate and dimethyl carbonate.

3. The electrolyte solution for a secondary battery according to claim 1, wherein the non-aqueous electrolyte solvent further comprises at least one fluorinated phosphate ester selected from the group consisting of tris (trifluoromethyl) phosphate, tris (pentafluoroethyl) phosphate, tris (2,2,2-trifluoroethyl) phosphate, tris (2,2,3,3-tetrafluoropropyl) phosphate, tris (3,3,3-trifluoropropyl) phosphate, and tris (2,2,3,3,3-pentafluoropropyl) phosphate.

4. A secondary battery comprising the electrolyte solution for a secondary battery according to claim 1.

5. The secondary battery according to claim 4, comprising a positive electrode comprising a positive electrode active material which operates at 4.5 V or higher versus lithium.

6. The secondary battery according to claim 5, wherein the positive electrode active material is a lithium manganese composite oxide represented by any of the following Formulas (4), (5), and (6):

$$Li_a(M_xMn_{2-x-y}Y_y)(O_{4-w}Z_w) \quad (4)$$

wherein in Formula (4), 0.4≤x≤1.2, 0≤y, x+y<2, 0≤a≤1.2 and 0≤w≤1 are satisfied; M includes at least one selected from the group consisting of Co, Ni, Fe, Cr, and Cu; Y is at least one selected from the group consisting of Li, B, Na, Mg, Al, Ti, Si, K, and Ca, Z is at least one of F and Cl;

$$LiMPO_4 \quad (5)$$

wherein in Formula (5), M is at least one of Co and Ni; and

$$Li(Li_xM_{1-x-z}Mn_z)O_2 \quad (6)$$

wherein in Formula (6), 0≤x<0.3 and 0.3≤z≤0.7 are satisfied, and M is at least one selected from Co, Ni, and Fe.

7. The secondary battery according to claim 5, wherein the positive electrode active material is a lithium manganese composite oxide represented by the following Formula (7):

$$LiNi_xMn_{2-x-y}A_yO_4 \quad (7)$$

wherein, in Formula (7), 0.4<x<0.6 and 0≤y<0.3 are satisfied, and A is at least one selected from Li, B, Na, Mg, Al, Ti, and Si.

8. A method for producing a secondary battery comprising an electrode element, an electrolyte solution, and an outer package, the method comprising the steps of:

producing the electrode element by placing a positive electrode and a negative electrode so as to be faced with each other; and encapsulating the electrode element, and the electrolyte solution which comprises the electrolyte solution for a secondary battery according to claim 1 into the outer package.

9. The electrolyte solution for a secondary battery according to claim 1, wherein the volume content of the open chain sulfone compound having 4 or more carbon atoms is 2-fold or more of the volume content of the open chain sulfone compound having 3 or less carbon atoms.

10. The electrolyte solution for a secondary battery according to claim 9, wherein the carbonate ester compound consists of ethylene carbonate and propylene carbonate.

11. The electrolyte solution for a secondary battery according to claim 10, wherein the open chain sulfone compound having 4 or more carbon atoms consists of ethyl isopropyl sulfone.

12. The electrolyte solution for a secondary battery according to claim 1, wherein the non-aqueous electrolyte solvent further comprises tris (2,2,2,-trifluoroethyl) phosphate.

* * * * *